(12) United States Patent
Somerfield

(10) Patent No.: US 11,570,064 B2
(45) Date of Patent: Jan. 31, 2023

(54) DYNAMIC SCOPE ADJUSTMENT

(71) Applicant: Ivanti, Inc., South Jordan, UT (US)

(72) Inventor: Richard James Somerfield, Warrington (GB)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 17/206,122

(22) Filed: Mar. 19, 2021

(65) Prior Publication Data
US 2021/0377132 A1   Dec. 2, 2021

Related U.S. Application Data

(60) Provisional application No. 62/993,026, filed on Mar. 22, 2020.

(51) Int. Cl.
| | | |
|---|---|---|
| *H04L 41/5022* | (2022.01) | |
| *H04L 41/50* | (2022.01) | |
| *H04L 41/507* | (2022.01) | |
| *H04L 41/5074* | (2022.01) | |
| *G06Q 10/00* | (2012.01) | |
| *G06Q 10/06* | (2012.01) | |

(52) U.S. Cl.
CPC ......... *H04L 41/5022* (2013.01); *G06Q 10/06* (2013.01); *G06Q 10/20* (2013.01); *H04L 41/507* (2013.01); *H04L 41/5032* (2013.01); *H04L 41/5074* (2013.01)

(58) Field of Classification Search
CPC ............. H04L 41/5022; H04L 41/5032; H04L 41/507; H04L 41/5074; G06Q 10/06; G06Q 10/20
See application file for complete search history.

(56) References Cited

U.S. PATENT DOCUMENTS

| | | | |
|---|---|---|---|
| 8,135,612 B1 | 3/2012 | Scudder | |
| 9,940,349 B2 | 4/2018 | Buerk et al. | |
| 2008/0269921 A1 | 10/2008 | Banerji et al. | |
| 2009/0138510 A1 | 5/2009 | Childress et al. | |
| 2017/0262621 A1* | 9/2017 | Venkataraman | ...... G06F 21/604 |

(Continued)

FOREIGN PATENT DOCUMENTS

| | | |
|---|---|---|
| EP | 3217312 A1 | 9/2017 |
| EP | 3617917 A1 | 3/2020 |

OTHER PUBLICATIONS

International Search Report and Written Opinion for Application No. PCT/US2021/023429, dated Jun. 14, 2021, 11 pages.

(Continued)

*Primary Examiner* — Gil H. Lee
*Assistant Examiner* — Chhian (Amy) Ling

(57) ABSTRACT

An embodiment includes a method of secured, remote device access through dynamic scope adjustment in an incident management system. The method includes receiving an incident report indicative of a technical issue at a first device. Responsive to receipt of the incident report, the method includes determining that the first device is assigned an information technology (IT) support provider and dynamically elevating the first device to a scope of the IT support provider. Following a correction of at least a portion of the technical issue by the IT support provider, the method includes dynamically relegating the first device from the scope to prevent remote access to the first device following the correction.

20 Claims, 8 Drawing Sheets

(56) References Cited

U.S. PATENT DOCUMENTS

| | | | |
|---|---|---|---|
| 2017/0295197 A1* | 10/2017 | Parimi | H04L 63/10 |
| 2017/0353451 A1* | 12/2017 | Metke | H04L 63/08 |
| 2018/0101390 A1* | 4/2018 | Warner | G06F 3/04817 |
| 2018/0253487 A1 | 9/2018 | Carteri et al. | |
| 2018/0367469 A1* | 12/2018 | Re | H04L 47/824 |
| 2019/0174208 A1* | 6/2019 | Speicher | H04Q 9/00 |
| 2020/0076819 A1* | 3/2020 | Spurlock | H04L 63/10 |
| 2020/0090087 A1* | 3/2020 | Singh | G06Q 10/103 |

OTHER PUBLICATIONS

Computer Hope, Linux Sudo Command, computerhope.com, May 4, 2019, available at https://www.computerhope.com/unix/sudo.htm (last visited Mar. 22, 2020.

International Preliminary Report on Patentability for Application No. PCT/US2021/023429, dated Sep. 22, 2022, 6 pages.

* cited by examiner

DYNAMIC SCOPE ADJUSTMENT

CROSS-REFERENCE TO RELATED APPLICATION

This application is claims priority to and the benefit of U.S. Provisional Application No. 62/993,026, which is incorporated herein by reference in its entirety.

FIELD

The embodiments discussed in this disclosure are related to information technology service management (ITSM) and incident management systems, and in particular to dynamic scope adjustment of information technology support providers in the ITSM and incident management systems.

BACKGROUND

Some networks of devices are supported by information technology service management (ITSM) and systems. The ITSM system is implemented to deploy one or more network support services such as tracking computing assets and devices, automating changes to the computing assets, and incident management services among others. The incident management services of the ITSM system are sometimes comprised of one or more incident management servers and one or more IT support providers. The incident management servers manage incident and helpdesk operations such as ticket generation, ticket assignment, metric measurement and aggregation, and the like. The IT support providers interface with the incident management servers to perform operations to correct or mitigate incidents or technical issues experienced at user devices. The IT support providers may be assigned access privileges to a subset of the user devices, which may enable the IT support providers to remotely operate the user devices. The subset of the user devices a particular IT support provider has access privileges to is sometimes referred to as a scope or a scope of authorization. The access privileges enable the IT support providers to remotely access and/or modify the user devices. For instance, the IT support providers may remotely access the subset of the user devices to correct a technical issue.

Design of the ITSM system involves a balance of security of the network with the efficiency of implementation of network services. For instance, an ITSM system that grants broad authorization to the IT support providers is designed for efficiency. However, the broad authorization introduces security threats. In particular, the IT support providers are able to access the user devices within the broad authorization with minimal or no real time visibility. The IT support providers may control and operate the user devices. Operation of the user device by the IT support provider may occur anonymously. For instance, an operation performed by one of the IT support providers may appear to have been conducted by a user assigned to one of the user devices. Moreover, the IT support providers may retrieve or review information and data on the subset of user devices.

Accordingly, a need exists in the field of ITSM and related network support service and for systems and methods that remove or mitigate the security threat introduced by authorization granted to IT support providers.

The subject matter claimed herein is not limited to embodiments that solve any disadvantages or that operate only in environments such as those described. Rather, this background is only provided to illustrate one example technology area where some embodiments described herein may be practiced.

SUMMARY

An aspect of an embodiment includes a method of secured, remote device access through dynamic scope adjustment. The method may be implemented in an incident management system or by an incident management server. The incident management system may include or be implemented in a cloud-based networked system. In other embodiments, the incident management system may be implemented in an on-premises network. The incident management system may include an incident management server, a first device, a second device, and a third device. The method may include receiving an incident report, which may be indicative of a technical issue being experienced at the first device. Responsive to receipt of the incident report, the method may include determining that the first device is assigned a first information technology (IT) support provider of multiple IT support providers. The first IT support provider may be associated with the second device. The first device may be statically assigned to the first IT support provider or dynamically assigned responsive to the incident report. The method may include initiating an audit process based on the received incident report. The audit process may be initiated automatically in response to the incident report. The method may include dynamically elevating the first device to a scope of the first IT support provider. The dynamically elevation of the first device may include a modification of an access privilege of the second device relative to the first device. In detail, the modification of the access privilege may include a modification from a first state in which the first device is prevented from being remotely accessed by the second device to a second state in which the second device is capable of remotely accessing the first device and remotely implementing at least one change on the first device via a network communication channel. The first device may be remotely accessed by the second device while the first device is elevated into the scope. Additionally, the method may include dynamically elevating a feature of the first IT provider relative to the first device. The feature may include an ability to remotely implement an action on the first device. The dynamic elevating may be performed substantially concurrent with or without material delay following receipt of the incident report from the first device. The method may include receiving a resolution message from the second device, the resolution message may indicate a status of the correction such as that the correction has occurred. Following a correction of at least a portion of the technical issue by the first IT support provider, the method may include dynamically relegating the first device from the scope, which may prevent remote access to the first device following the correction by the second device. The dynamically relegating the first device may be performed responsive to the resolution message. Additionally or alternatively, the dynamic relegating may be performed substantially concurrent with or without material delay following receipt of the resolution message. The method may include implementation of at least one change on the first device. The method may include imposing a restriction on the access to the first device by the second device while the first device is elevated to the scope. Responsive to a requested access to the first device by the second device, the method may include determining that the restriction is triggered. Responsive to the restriction being triggered, the method may include preventing access to the first device by the second device. The restriction may include one or more or a combination of a time period during which access to the first device is allowed, an application to which a change to the first device is limited, a subsystem to which a change to the first device is limited, and a work condition of the second device that must be present to allow access of the first device by the second device. The incident management server may include helpdesk ticket system. In helpdesk ticket systems applications, a helpdesk application may be loaded onto the user devices. The helpdesk application may include a helpdesk ticket submission capability. For instance, the user may notice the technical issue and in response provide some input to the user device or another device to initiate a ticket that outlines the technical issue. The ticket may be communicated to the system server and may be the basis of intervention by the IT support providers. The incident report from the first device may include a helpdesk ticket. The help desk ticket may be at least partially input by a first user into the first device or into another device associated with the first user. Additionally, the resolution message may include a helpdesk ticket closure or a helpdesk ticket partial closure. The helpdesk ticket closure or the helpdesk ticket partial closure may be initiated by the first IT support provider in the second device or another device associated with the first IT support provider. The second device and the third device may be involved in correction of the technical issue. In detail, the method may include dynamically elevating the first device to a second scope. The second scope may be a scope of a second IT support provider, who may be associated with the third device. The dynamically elevating the first device to the second IT support provider may occur following or immediately following dynamically relegating the first device from the first scope. For instance, after the first IT support provider communicates a resolution message that the first part of the correction is implemented or they are unable to correct the issue, the system server may then dynamically elevate the first device to the second scope of the second IT support provider. Additionally, as described above with respect to the second device, the first device may be dynamically relegated from the second scope. The dynamic relegation may prevent or substantially prevent remote access to the first device following the second correction by the third device. In some embodiments, the dynamic relegation may be performed by the incident management server.

Another aspect of an embodiment includes a non-transitory computer-readable medium having encoded therein programming code executable by one or more processors to perform or control performance of any combination of the operations of the methods of secured, remote device access through dynamic scope adjustment described above.

Yet another aspect of an embodiment includes an incident management system comprising one or more processors and a non-transitory computer-readable medium having encoded therein programming code executable by one or more processors to perform or control performance of any combination of the operations of the methods of secured, remote device access through dynamic scope adjustment described above.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1:
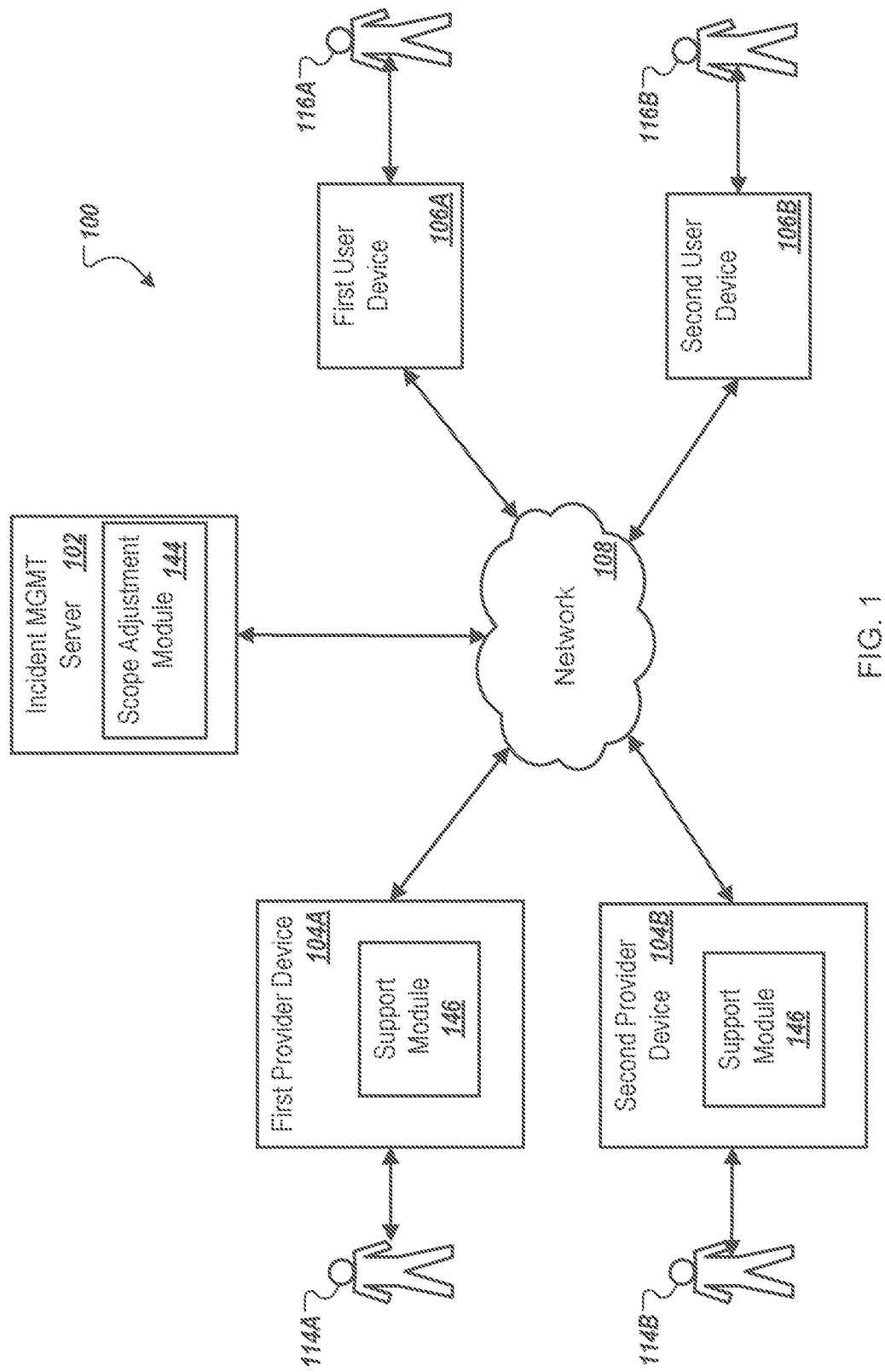
FIG. 1 depicts an example operating environment in which some embodiments of the present disclosure may be implemented.

Implementation of an information technology (IT) support service requires a balance between enabling access to user devices of a managed network and efficiency of implementing support solutions. For instance, some conventional IT support services enable broad authorization to access the user devices. The efficiency of these services may increase because latency associated with providing access is removed. However, the broad authorization introduces security threats to the managed network because the user devices can be accessed and operated without real time control and without real time monitoring. In contrast, some conventional IT support services strictly control access to the user devices. These services prioritize security. However, the efficiency and speed at which IT support services can be provided suffers. For instance, each incident may require manual changes to access privileges between devices and subsequent removal of the access privileges.

Some conventional systems implement role-based authorization schemes. In role-based authorization schemes, authorization to access devices may be based on an individual's role in an organization. The role-based authorization scheme provides some security through controlling access privileges based on role authorization. For instance, a manager may have authorization to access and control more features of more user devices than a new engineer.

In role-based authorization schemes, the features and user devices that are assigned to a role may be controlled by a scope or scope of authorization. The scope may include a subset of user devices of a managed network and/or a subset of features that may be modified on the user devices. A user device included in the scope may be access and controlled entirely. Alternatively, one or more of the features on the user devices may be specified, which may limit which systems or operations that may be performed.

However, the role-based authorization schemes enable access on a continuous basis. For instance, once the scope of a role is defined, the individual in the role may access and control the user devices at any time, which may include periods in which the devices are not experiencing technical issues. The authorization granted in the role-based authorization schemes are generally without real time control or visibility. Accordingly, the user devices are vulnerable to unauthorized access and activity. This security threat is particularly relevant in circumstances in which IT support is provided by an outside or unaffiliated organization. For instance, a first organization may contract for IT support by another, separate organization. In these circumstances, the continuous access to the user devices by a separate organization represents a security threat to the integrity of the managed network.

Accordingly, these conventional systems may benefit from dynamic scope adjustments. For instance, some embodiments of the present disclosure describe an IT support service in which the scope of an IT support provider (hereinafter, "IT provider") is dynamically adjusted responsive to receipt of an incident report indicating an incident or a technical issue. An adjustment to the scope of an IT provider includes an elevation of the user device experiencing the technical issue to the scope of the IT provider. The elevation enables temporarily access to a user device experiencing the technical issue. Following correction of the technical issue, the user device is relegated from the scope of the IT provider. Accordingly, the IT provider only has access to the user device while the technical issue is being experienced. Additionally, the dynamic scope adjustment may include elevation of specific features related to specific user devices. For instance, the technical issue may relate to a specific application on a specific user device. The dynamic scope adjustment may include elevation of the specific user device and elevation of the feature associated with the specific application. Thus, access to the device by the IT provider may be strictly controlled.

In some embodiments, the adjustment to the scope may be automated and may be centrally controlled by an incident management server. Accordingly, visibility of actions by IT provider is improved, which enables improved auditing of incident management services. Additionally, the dynamic adjustment to the scope may be immediately responsive to the incident report communicated by the user device, which may mitigate or eliminate latency issues. Moreover, the IT provider may be previously assigned to the user device, such that the adjustment to the scope does not require an assignment algorithm, but merely enabling an access privilege. In some environments, the scope adjustment may occur with an auditing operation. For instance, the incident report from the user device may prompt the scope adjustment as well as the auditing operation.

Thus, embodiments described in the present disclosure provide a technical improvement to conventional IT support service systems. For instance, systems implementing dynamic scope adjustments may provide essentially zero access privilege outside of a controlled, monitored circumstance. This eliminates continuous authorization present in conventional role-based systems. The dynamic scope adjustment improves security of managed networks while maintaining efficient, effective incident mitigation services.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 depicts an example operating environment 100 in which some embodiments of the present disclosure may be implemented. The operating environment 100 may be configured to provide an IT support service to a first user device 106A and a second user device 106B (generally, user device 106 or user devices 106). For example, a first provider device 104A, a second provider device 104B (generally, provider device 104 or provider devices 104), and an incident management server 102 may provide the IT support service to the user devices 106.

The IT support service may involve the provider devices 104 accessing and operating the user devices 106. In some instances, the provider devices 104 remotely access and operate the user devices 106 via a network 108. While operating the user devices 106, the provider devices 104 may communicate control signals that result in the changes to the user devices 106. In most circumstance, the changes are implemented to correct technical issues or incidents on the user devices 106. For instance, the changes may include installing patches or updates, downloading software or data, uninstalling unauthorized software, reloading or changing a setting on a software application or hardware device, installing new software, scanning the user device 106, similar changes, combinations thereof, and the like.

In conventional implementations of the operating environment 100, an authorization to access the user devices 106 by the provider devices 104 may be statically controlled. For instance, an administrator may enable an access privilege between the first provider device 104 and the first user device 106 based on role, specialization, a nature of the technical issue, or another factor. The access privilege may exist regardless of whether a technical issue is currently being experienced at the first user device 106A. For example, the first provider device 104A may access and operate the first user device 106A at any time once the first user device 106A is assigned to the first IT provider 114A.

Continuous or unmonitored access privilege to the first user device 106A introduces a security threat to the user devices 106. For example, a first IT provider 114A associated with the first provider device 104A may operate the first user device 106A to perform nefarious actions. For instance, the first IT provider 114A may install harmful code (e.g., viruses, etc.), copying or review documents and data on the user devices 106, changing settings on the user devices 106, and the like. The nefarious actions may be implemented without the user devices 106 recognizing their occurrence.

Accordingly, in the operating environment 100, the incident management server 102 may include a scope adjustment module 144 and the provider devices 104 may include support modules 146. The scope adjustment module 144 and/or the support modules 146 may be configured for dynamic scope adjustment and incident management. As used in the present disclosure, the scope refers to the user devices 106 or a subset thereof and features of the user devices 106 that the provider devices 104 and/or IT providers 114 are authorized to access and/or control. Adjustment of the scope includes dynamic elevation and dynamic relegation of the user devices 106 to and from the scope of the provider devices 104 and/or the IT providers 114. The elevation of the user devices 106 enables remote access to the user devices 106 by the by the provider devices 104 and/or enables remote control of the one or more features of the user devices 106. The relegation of the user devices 106 removes access to the user devices 106 by the provider devices 104 or removes control of the one or more features of the user devices 106.

The elevation and relegation of the user devices 106 coincides with and is directly responsive to incidents and technical issues experienced at the user devices 106. For example, the incident management server 102 or the scope adjustment module 144 may elevate the first user device 106A to a scope of the first provider device 104A responsive to an incident report communicated by the first user device 106A that indicates it is experiencing the technical issue. The first provider device 104A may implement a change at the first user device 106A using the support module 146. Following correction of the technical issue, the first provider device 104A may communicate a resolution message indicating the correction to the incident management server 102. Responsive to the resolution message, the incident management server 102 may relegate the first user device 106A from the scope of the first provider device 104A. Accordingly, the incident management server 102 may control access to the user devices 106 based on the incident report and the resolution message communicated by the user devices 106 and the provider devices 104. Additionally, the provider devices 104 may only have access to the user devices 106 while the user devices 106 are elevated into the scope of the provider devices 104. In some embodiments, the scope may include a subset of the user devices 106 and/or a subset of features on the user devices 106. The dynamic scope adjustment may include elevation of at least one of the subset the user devices 106 and/or elevation of at least one of the features of the user devices 106.

Thus, embodiments of the present disclosure provide a technical improvement to the operating environment 100. For instance, the dynamic scope adjustment may mitigate or eliminate the security threats and vulnerabilities introduced by continuous access to the user devices 106 by the provider devices 104. The dynamic scope adjustment may accordingly improve network and data security relative to conventional IT support service systems. Additionally, embodiments described in the present disclosure are related to an internet-centric technological field. For example, the embodiments described herein relate to remote access to the user devices 106 via the network 108, electronic/optical messages and signals communicated via the network 108 between the provider devices 104 and the user devices 106, and computer data modification of resulting in changes to access privileges and remote implementation of changes to computing devices.

The operating environment 100 may include the incident management server 102, the provider devices 104 associated with the IT providers 114, the user devices 106 associated with the users 116A and 116B, and the network 108. Each of these components are described in the following paragraphs. The components of the operating environment 100 may be included in a cloud-based network, an on-premises network, a managed network, managed subnetwork, or another suitable network computing environment. Some additional details of some suitable networks may be as described in U.S. patent application Ser. No. 16/287,335, which is incorporated herein in by reference in its entirety.

The network 108 may include any communication network configured for communication of signals between any of the components (e.g., 102, 106, and 104) of the operating environment 100. The network 108 may be wired or wireless. The network 108 may have numerous configurations including a star configuration, a token ring configuration, or another suitable configuration. Furthermore, the network 108 may include a local area network (LAN), a wide area network (WAN) (e.g., the Internet), and/or other interconnected data paths across which multiple devices may communicate. In some embodiments, the network 108 may include a peer-to-peer network. The network 108 may also be coupled to or include portions of a telecommunications network that may enable communication of data in a variety of different communication protocols.

In some embodiments, the network 108 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 108 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the incident management server 102, the user devices 106, and the provider devices 104.

The user devices 106 may include hardware-based computing systems. The user devices 106 generally refer to computing assets or devices that are implemented in a managed network such as an office, governmental, or business environment. For example, the user device 106 may include a laptop computer, a desktop computer, a mobile device (e.g., tablet, smart phone, etc.), a printer, server devices, a smart screen, a telephone system, and the like. Additionally, in some embodiments, the user devices 106 may include or be communicatively coupled to a data storage computing system such as a database server. The user devices 106 may be selectively, communicatively coupled to the incident management server 102 and the provider devices 104 via the network 108. Accordingly, the user devices 106 may be selectively accessed via the network 108. For example, the provider devices 104 or the support module 146 may be configured to remotely access the user devices 106 to implement changes to the user devices 106 or applications or sub-systems implemented on the user devices 106.

The user devices 106 may have loaded thereon one or more software components and may include one or more hardware components. The software components may include, for instance, operating systems, component drivers, software applications, and the like. The hardware components may include storage devices, processors, monitors, user devices, graphic cards, sound cards, and the like. The user devices 106 may develop technical issues or the technical issues may arise as the user devices 106 age, the systems are updated, or the users 116 introduce issues into the user devices 106.

The user devices 106 may be associated with users 116A and 116B (generally, user 116 or users 116). The users 116 may include a person or set of people who regularly operate or are otherwise affiliated with the user devices 106. In some implementations, the users 116 may be uniquely associated with one of the user devices 106. The user 116 may operate one of the user devices 106 or another user device to generate an incident report indicating a technical issue and communicate the incident report to the incident management server 102. The incident report may include information related to the user device 106 experiencing the technical issue (e.g., device identifier, IP address, etc.), the nature of the technical issue, identification of the user 116, subsystems effected, priority or urgency, other relevant information (e.g., when the technical issue started, other corrective measures, etc.), or combinations thereof.

For example, in some embodiments, the operating environment 100 may include a ticket-based helpdesk system. In these and other embodiments, the user 116 may generate a ticket, which corresponds to the incident report, by either filling out an electronic form or selecting an electronic form with information related to a technical issue on the user device 106. The ticket may be communicated to the incident management server 102.

The user devices 106 may form or be included in a managed system. In some embodiments, one or both of the user devices 106 may be affiliated with a separate organization than the incident management server 102 and the provider devices 104. For instance, the user devices 106 may be a customer of a second entity that operates the incident management server 102 and the provider devices 104. In these embodiments, the user devices 106 may operate on a separate intranet that may form a part of the network 108. In some embodiments, one or both of the user devices 106, the provider devices 104, and the incident management server 102 may be associated with a common organization. In these embodiments, the user devices 106, the provider devices 104, and the incident management server 102 may be connected to a local intranet or an enterprise network, for instance.

The provider devices 104 may include hardware-based computing systems. The provider devices 104 generally refer to computing assets or devices that are implemented to provide IT support the user devices 106. For example, the provider devices 104 may include laptop computers, desktop computers, mobile devices (e.g., tablets, smart phones, etc.), server devices, and the like. The provider devices 104 are selectively communicatively coupled to the user devices 106 via the network 108. For instance, the incident management server 102 or the scope adjustment module 144 are configured to dynamically adjust the scope of the provider devices 104 or the IT providers 114, which enables remote access and control to the user devices 106.

The provider devices 104 may be associated with the IT providers 114A and 114B. As described with reference to the user devices 106, the association between the IT providers 114 and the provider devices 104 may indicate that the IT providers 114 regularly or normally operate the provider devices 104. Thus, information and signals directed to the IT providers 114 may be received by a corresponding provider device 104A.

Consistent with the association, the scope adjustments may be made relative to the provider devices 104 and/or the IT providers 114. For instance, the incident management server 102 may assign the first user device 106A to the first IT provider 114A. Accordingly, the incident management server 102 may elevate the first user device 106A to the scope of the first IT provider 114A, which may be reflected on the support module 146 of the first provider device 104A. Following the elevation, the first IT provider 114A may use the support module 146 on the first provider device 104A to access and/or implement a change on the first user device 106A.

The support module 146 may be configured to provide IT support services to the user devices 106. The support module 146 may be configured to receive assigned technical issues from the incident management server 102, access the user devices 106 remotely via the network 108, communicate commands and control signals to the user devices 106 to implement changes or corrections to the user devices 106 or subsystems on the user devices 106, and communicate resolution messages with the incident management server 102 and/or other provider devices 104.

The incident management server 102 may include a hardware-based computing system. The incident management server 102 is configured to communicate with the provider devices 104 and the user devices 106 via the network 108. The incident management server 102 may have loaded on it the scope adjustment module 144. The scope adjustment module 144 may be configured for secured, remote device access through dynamic scope adjustment in the operating environment 100.

The scope adjustment module 144, support module 146, and components thereof may be implemented using hardware including a processor, a microprocessor (e.g., to perform or control performance of one or more operations), a field-programmable gate array (FPGA), or an application-specific integrated circuit (ASIC). In some other instances, the scope adjustment module 144, support module 146, and components thereof may be implemented using a combination of hardware and software. Implementation in software may include rapid activation and deactivation of one or more transistors or transistor elements such as may be included in hardware of a computing system (e.g., the incident management server 102 or the provider devices 104). Additionally, software defined instructions may operate on information within transistor elements. Implementation of software instructions may at least temporarily reconfigure electronic pathways and transform computing hardware.

For instance, the scope adjustment module 144, may receive the incident report that is indicative of a technical issue at one of the user devices 106. The incident report may be communicated via the network 108. Responsive to receipt of the incident report, the scope adjustment module 144 may determine that the first device is assigned to one of the IT providers 114 or the provider devices 104. For instance, the first user device 106A may be statically assigned to the first IT provider 114A or the incident management server 102 or the scope adjustment module 144 may assign the first user device 106A to the first IT provider 114A in real time based on information in the incident report.

The scope adjustment module 144 may initiate an audit process based at least partially on the received incident report. The audit process may be initiated automatically in response to the incident report. The scope adjustment module 144 may dynamically elevate, the user device 106 experiencing the technical issue to a scope of the particular IT provider (e.g., 114A or 114B) assigned to the user device 106. Dynamically elevating of the user device 106 includes a modification of an access privilege of the provider device 104 associated with the IT provider 114 relative to the user device 106. In particular, the modification of the access privilege may include a modification from a first state in which the user device 106 is prevented from being remotely accessed by the provider device 104 to a second state in which the provider device 104 is capable of remotely accessing the user device 106 and remotely implementing at least one change on the user device 106 via the network 108. In some embodiments, the dynamically elevating the user device 106 may include a modification to a feature to which the particular IT provider 114 can access or modify. In some implementations, the dynamic elevation is performed substantially concurrent with or without material delay following receipt of the incident report from the user device 106. As used herein, substantially concurrent indicates the elevation operation or another operation described therewith occurs simultaneously or as an automatic process without a delay imposed through an intended operation but may be delay some small amount of time due to physical limitations in processing components or as otherwise understood by one with skill in the art. For instance, the elevation operation may be within a small time period (e.g., within a one or two microseconds).

The scope adjustment module 144 may then receive a resolution message from the provider device 104. The resolution message may indicate the correction has occurred or that the particular IT provider 114 is otherwise completed their portion of the correction. In response, the scope adjustment module 144 may dynamically relegate the user device 106 from the scope of the particular IT provider. Relegation of the user device 106 from the scope may prevent or substantially prevent remote access to the user device 106 following the correction of the technical issue. The dynamic relegation may be performed substantially concurrent with or without material delay following receipt of the resolution message.

In some embodiments, the scope adjustment module 144 may impose a restriction on the access to the user device 106 by the provider device 104 while the user device 106 is elevated to the scope. For instance, responsive to a requested access to the user device 106 by the provider device 104, the scope adjustment module 144 may determine whether conditions present in the operating environment 100 trigger the restriction. Responsive to the restriction being triggered, the scope adjustment module 144 may prevent access to the user device 106 by the provider device 104. Some example restrictions include a time period during which access to the user device 106 is allowed or prohibited, an application to which a change to the user device 106 is limited, a subsystem to which a change to the user device 106 is limited, a work condition of the provider device 104 that must be present to allow access of the user device 106, other restrictions, or combinations thereof.

In some embodiments, multiple provider devices 104 or multiple IT providers 114 may be involved in correction of the technical issue. For instance, the correction may be challenging, and a first IT provider 114A may be unable to correct the technical issue. Additionally or alternatively, the technical issue may involve two or more steps that may be implemented by both of the IT providers 114. For example, the first IT provider 114A may correct a first part of the technical issue and the second IT provider 114B may correct a second part of the technical issue. In these and other embodiments, the scope adjustment module 144 may sequentially and/or independently elevate the user device 106 to the scopes of each of the IT providers 114. For instance, the scope adjustment module 144 may elevate the user device 106 as described above to the scope of the first provider device 104A. Following receipt of the resolution message indicating the correction by the first provider device 104A, the user device 106 may be relegated from the scope of the first IT provider 114A. Concurrently, or without material delay, the user device 106 may be dynamically elevated to the scope of the second IT provider 114B. Following the correction implemented by the second IT provider 114B, the second provider device 104B may communicate an additional resolution message to the incident management server 102. Responsive to the additional resolution message, the user device 106 may be relegated from the scope of the second IT provider 114B. Thus, each of the IT providers 114 only have access to the user device 106 while the user device 106 is elevated. The access is removed following completion of each part of the corrective action.

Additionally, as the scope is elevated, the scope adjustment module 144 may incorporate metrics and information into an audit conducted at least partially by the incident management server 102. The metrics may track resolution and steps associated with correction of the technical issue.

The IT support service implemented in the operating environment 100 may be implemented with one or more other complementary or related services. For example, the IT support service may be provided along with vulnerabilities assessment, device (e.g., 104A, 104B, 106A, 106B, and 102) and user (e.g., 114A, 114B, 116A, and 116B) management, application update services, hardware replacement, network security, data storage and data management, and the like. The IT support service and the complementary services may be integrated and provided as a unified management system to multiple entities or organizations that each include one or more of the user devices 106. For instance, the first user device 106A might be included in a first enterprise network and the second user device 106B might be included in a second enterprise network. The incident management server 102 and the provider devices 104 may be configured to support both enterprise networks simultaneously.

Modifications, additions, or omissions may be made to the operating environment 100 without departing from the scope of the present disclosure. For example, the operating environment 100 may include one or more incident management servers 102, one or more provider devices 104, one or more user devices 106, or any combination thereof. Moreover, the separation of various components and servers in the embodiments described herein is not meant to indicate that the separation occurs in all embodiments. For example, the incident management server 102 may be integrated with one of the provider devices 104. Moreover, it may be understood with the benefit of this disclosure that the described components and servers may generally be integrated together in a single component or server or separated into multiple components or servers.

Figure 2:
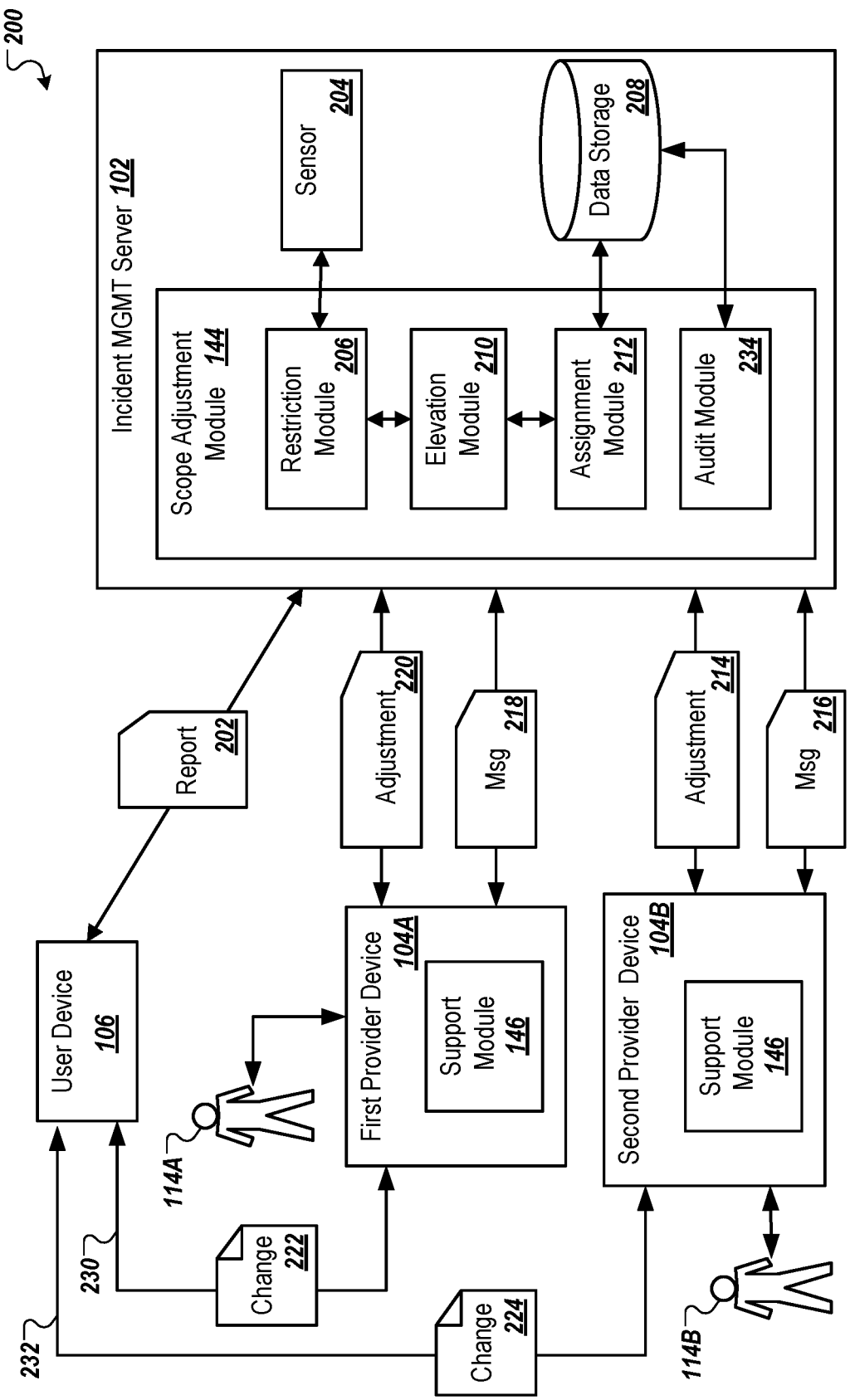
FIG. 2 depicts an example remote device access process that may be implemented in the operating environment of FIG. 1.

FIG. 2 depicts an example remote device access process (access process) 200 according to at least one embodiment of the present disclosure. The access process 200 of FIG. 2 is depicted with reference to a subset of the components (e.g., 102, 106, 104, 146, and 144) described elsewhere in the present disclosure. In the embodiment of FIG. 2, the incident management server 102 includes a data storage component (data storage) 208, a sensor 204, and the scope adjustment module 144, which may further include a restriction module 206, an elevation module 210, and an assignment module 212. In some embodiments, the sensor 204, the data storage 208, the scope adjustment module 144, one or more components (e.g., 206, 210, and 212) of the scope adjustment module 144, or some combination thereof and functions associated therewith may be included in another computing device such as the provider devices 104. Additionally or alternatively, one or more of the sensor 204, the data storage 208, the scope adjustment module 144, one or more components (e.g., 206, 210, and 212) of the scope adjustment module 144, or some combination thereof and functions associated therewith may be omitted in some embodiments.

The access process 200 may control or limit access to the user device 106 by one or both of the first provider device 104A and the second provider device 104B. The access process 200 may be implemented to prevent access to the user device 106 during some circumstances and enable or facilitate access to the user device 106 under other circumstances. The access process 200 improves a conventional system by mitigating or eliminating a security threat introduced by enabling consistent and/or permanent access to the user device 106 by the provider devices 104. In some embodiments, the access to the user device 106 may enable one or both of the provider devices 104 to implement a change (e.g., 222 or 224) at the user device 106. The change 222 or 224 may alter a state of the user device 106, which may correct a technical issue at the user device 106. Additionally or alternatively, the change 222 or 224 include one or more diagnostic actions that may be remotely implemented by the provider devices 104. Accordingly, in some embodiments, the access process 200 may enable access to the user device 106 only when the provider devices 104 are evaluating a technical issue or implementing the change 222 or 224 on the user device 106. When there is no need evaluate the technical issue or implement the change 222 or 224, the provider devices 104 may be prevented from accesses the user device 106.

In some embodiments of the access process 200, the scope adjustment module 144 of the incident management server 102 may implement dynamic scope adjustment. The dynamic scope adjustment may include modifications to access privileges related to the user device 106. The modifications may be made in real time and/or immediately responsive to one or more reports or messages 202, 218, and 216. For instance, a scope of the first provider device 104A may be adjusted responsive to an incident report 202, which may enable an access privilege between the first provider device 104A and the user device 106. Following a first change 222, the scope of the first provider device 104A may be adjusted to limit or remove the access privilege, which may prevent access to the user device 106 by the first provider device 104A. Accordingly, access to the user device 106 by the first provider device 104A may be actively limited by the incident management server 102.

In some embodiments, the access process 200 may include communication of an incident report 202 from the user device 106 to the incident management server 102. The incident report 202 may be indicative of a technical issue at the user device 106. The technical issue may include, for example, a software or hardware malfunction, a request for installation or removal of software or hardware, another failure, error, or some combination thereof.

The incident report 202 may be generated or initiated by a user such as the user 116 of FIG. 1. In some embodiments, the access process 200 may be implemented in a helpdesk ticket system. In these and other embodiments, the incident report 202 may include a helpdesk ticket that a user initiates on the user device 106. Helpdesk tickets may include a template that the user fills in, a web-based submission user interface, an automated process implemented at least partially by an agent on the user device, or another suitable ticket system. Additionally, the incident report 202 may include another electronic or conventional message. For example, the user device 106 may include an email or a web-based chat application (e.g., SLACK, TEAMS, etc.). The user device 106 may communicate an email message or a chat message to the incident management server 102. Additionally still, the incident report 202 may include a conventional message such as a telephone call, a written message, or a text message, which may be communicated from the user device 106 or another device.

The incident report 202 may be received at the incident management server 102. In embodiments in which the incident report 202 includes an electronic message, the incident management server 102 may automatically receive and/or process the incident report 202. For instance, in embodiments in which the incident management server 102 is implemented in a helpdesk ticket system, information such as identification of the user device, identification of the user, identification of technical issue or effected components or functions of the user device 106, may be automatically or semi-automatically extracted from the incident report 202. In embodiments in which the incident report 202 is conventional, an intermediate process, which may include a manual process, may be implemented to enter information from the incident report 202 to the incident management server 102.

The incident report 202 or information included in the incident report 202 may be processed by the scope adjustment module 144 to identify the user device 106 or the user associated with the user device 106. The assignment module 212 may be configured to determine that the user device 106 is assigned to the first provider device 104A and/or an IT provider 114 associated with the first provider device 104A. In some embodiments, the user device 106 may be statically or permanently assigned to the first provider device 104A. In these embodiments, the assignment module 212 may access the information from the data storage 208. In other embodiments, the assignment module 212 may be configured to determine to which of the provider devices 104 the user device 106 is assigned. In some embodiments, the assignment module 212 may access information stored on the data storage 208 and conduct an analysis of the incident report 202, qualifications of IT providers, a load of the IT providers, other factors related to the technical issue, or some combinations thereof. The assignment module 212 may then assign the user device 106 to the first provider 114A based on the analysis.

An assignment between the user device 106 and the first provider device 104A may be communicated to the elevation module 210. The elevation module 210 may be configured to dynamically elevate the user device 106 to a scope of the first IT provider 114A who is associated with the first provider device 104A. In some embodiments, the incident management server 102 may communicate a first adjustment 220 to the first provider device 104. The first adjustment 220 may be a control signal and/or a notification of the scope adjustment. The first adjustment 220 may be received and implemented by the support module 146 to dynamically elevate the user device 106 to the scope of the first provider device 104A.

Dynamic elevation of the user device 106 may include a modification of an access privilege of the first provider device 104A associated with the first IT provider 114A relative to the user device 106. Accordingly, while the user device 106 is elevated to the scope of the first IT provider 114A, the first provider device 104A may access the user device 106. Access to the user device 106 may enable the first provider device 104A to remotely implement the first change 222 on the user device 106.

In embodiments in which the incident report 202 is indicative of a technical issue, the scope adjustment by the elevation module 210 enables the first IT provider 114A to access the user device 106 to correct technical issue, partially correct the technical issue, diagnose the technical issue, attempt to correct the tech correct the technical issue, or some combination thereof. In some embodiments, the dynamic elevation may be performed substantially concurrent with or without material delay following receipt of the incident report 202 from the user device 106.

The modification of the access privilege may include a modification from a first state to a second state. In the first state, the user device 106 may be prevented or substantially prevented from being remotely accessed by the first provider device 104A. In the second state, the first provider device 104A may be capable of remotely accessing the user device 106 and remotely implementing the change 222 on the user device 106 via a network communication channel 230. Additionally, the dynamic elevation may include an additional modification to a feature of the user device 106. The feature may be elevated to the scope of the first provider device 104A, which may enable remote implementation of an action on the user device 106. Some additional details of the dynamic elevation are described with reference to FIG. 3.

Following implementation of the change 222 or otherwise attempting to correct the technical issue at the user device 106, the first provider device 104A or the support module 146 may communicate a resolution message 218 to the incident management server 102. The resolution message 218 may indicate that the first IT provider 114A has completed their contribution to correct the technical issue of the user device 106. For instance, the resolution message 218 may indicate that a correction of at least a portion of the technical issue has occurred.

Responsive to the resolution message 218, the elevation module 210 may dynamically relegate the user device 106 from the scope of the first IT provider 114A. Dynamic relegation of the user device 106 from the scope may modify the access privilege of the first provider device 104A, which may prevent or substantially prevent access to the user device 106 by the first provider device 104A. The dynamic relegation may be performed substantially concurrent with or without material delay following receipt of the resolution message 218.

In the depicted and other embodiments, two or more of the provider devices 104 may be involved in correction of the technical issue. For instance, the correction may be challenging, and a first IT provider 114A may be unable to correct the entire technical issue. Additionally or alternatively, the technical issue may involve two or more steps that may be implemented by the two or more IT providers 114. For example, the first IT provider 114A may correct a first part of the technical issue and the second IT provider 114B may correct a second part of the technical issue.

In these and other embodiments, the elevation module 210 may elevate the user device 106 to the scope of the second IT provider 114B and the second provider device 104B, which may enable the technical issue to be addressed by the second provider device 104B. Elevation of the user device 106 to the scope to the second IT provider 114B may be as described with reference to the first IT provider 114A. As described above, a resolution message 216 may be communicated to the second provider device 104B and/or the support module 146. The adjustment message 214 may enable or notify the second provider device 104B of the adjustment to the scope. While the user device 106 is elevated, the change 224 may be remotely implemented by the second provider device 104B. Following implementation of the change 224, the second provider device 104B may communicate a second resolution message 216. The second resolution message 216 may operate substantially similarly to the resolution message 218. Following receipt of the second resolution message 216, the user device 106 may be dynamically relegated from the scope of the second IT provider 114B, which may prevent or substantially prevent remote access to the user device 106 by the second provider device 104B.

In embodiments in which the incident management server 102 is included helpdesk ticket system, the resolution messages 218 and 216 may include a helpdesk ticket resolution, a helpdesk ticket closure, or a helpdesk ticket partial closure. The helpdesk ticket closure or the helpdesk ticket partial closure may be initiated by the IT providers 114 in the provider devices 104 or another device associated with the IT providers 114.

In some embodiments, the scope adjustment module 144 may include an audit module 234. The audit module 234 may be configured to initiate an audit process. The audit process may be initiated based on the received incident report 202 and/or automatically in response to the incident report 202. For example, the audit process may record the content of the incident report 202, the IT provider(s) 114 that correct the technical issue, resolution or changes 222 or 224 implemented to correct the technical issue, the user associated with the user device 106, the user device 106, the type or subsystem of the user device 106, other metrics, or combinations thereof. In some embodiments, the initiation of the audit process may occur concurrent with the scope adjustment and may be managed by the incident management server 102 as a centralized, multifunctional system.

Additionally, in some embodiments, the scope adjustment module 144 may include the restriction module 206 and/or the sensor 204. The restriction module 206 may interact with the sensor 204 and the elevation module 210 to impose a restriction on the access to the user device 106 by one or both of the provider devices 104 while the user device 106 is elevated to the scope. The restriction module 206 may determine whether a restriction is triggered during a period in which the scope is elevated. Imposing the restriction may further limit access to the user device 106 when the restriction is triggered. Some examples of the restriction include a time period during which access to the user device 106 is allowed, an application to which the changes 222 and/or 224 to the user device 106 is limited, a subsystem to which the changes 222 and/or 224 to the user device 106 is limited, a work condition of one or both of the provider devices 104 that must be present to allow access of the user device 106, another restriction, or some combination thereof. Some additional details of imposing a restriction are provided with reference to FIG. 4.

Figure 3A:
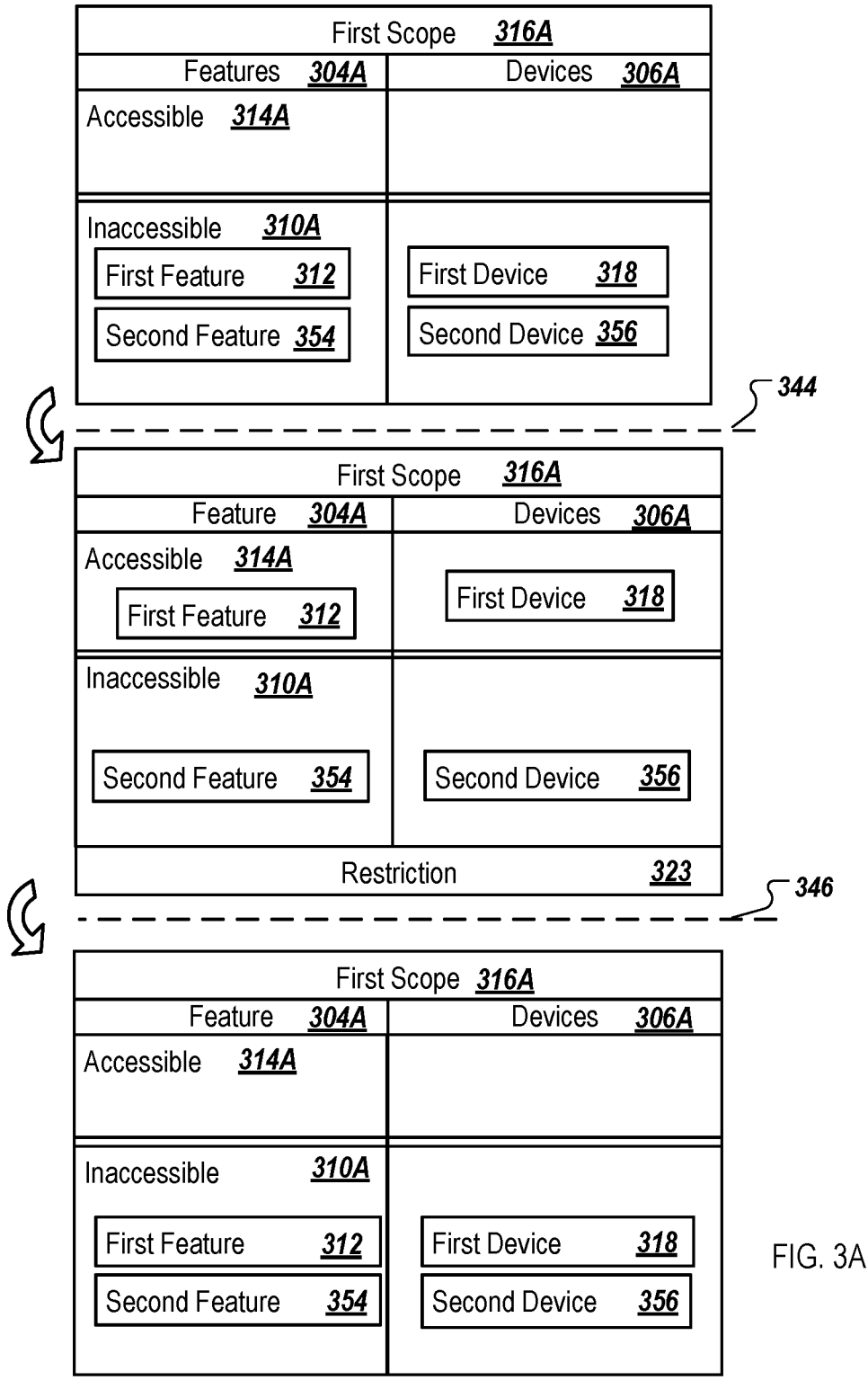
FIGS. 3A and 3B depicts tables representative of example scopes that may be implemented in the remote device access process of FIG. 2.
Figure 3B:
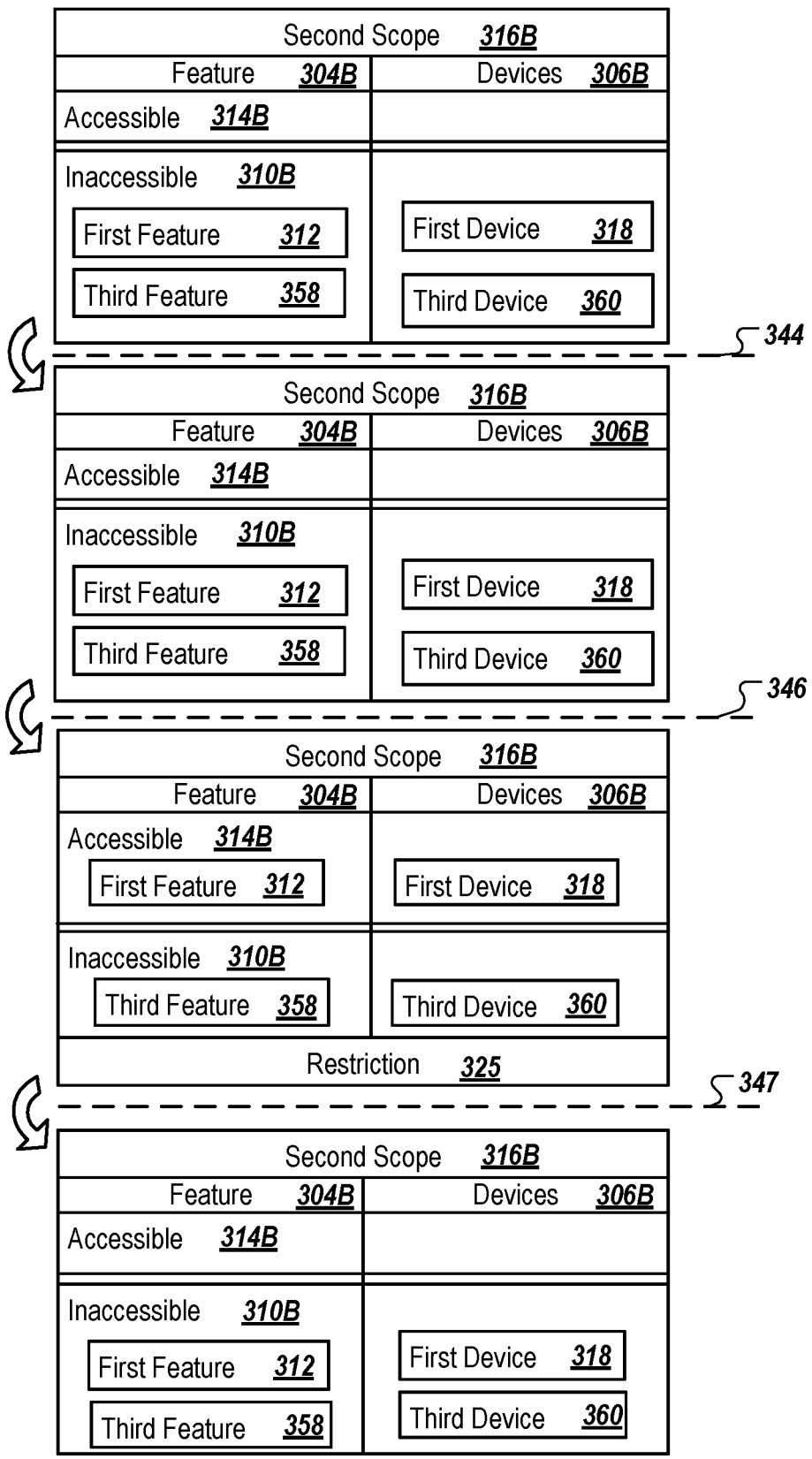

FIGS. 3A and 3B depicts tables 316A and 316B that may be representative of example scopes (generally, scope 316 or scopes 316) according to least one embodiment described in the present disclosure. The scopes 316 may be associated with two devices such as the provider devices 104 described above. The scopes 316 are depicted in sequences that illustrates elevation and relegation of a first device 318 and a first feature 312 through an adjustment process such as the access process 200.

The scopes 316 are separated into features 304A and 304B (generally, feature 304 or features 304) and devices 306A and 306B (generally, devices 306 or devices 306). Additionally, the features 304 and the devices 306 are separated into inaccessible portions 310A or 310B and accessible portions 314A or 314B. Devices 350, 360, and 356 or features 312, 354, and 358 depicted in the inaccessible portions 310A or 310B are not accessible by the provider device associated with the scope 316. Similarly, the devices 350, 360, and 356 or the features 312, 354, and 358 included in the accessible portions 314A or 314B are accessible by the provider device associated with the scope 316.

A first feature 312, a second feature 354, a first device 318 and a second device 356 are assigned to a first provider device associated with the first scope 316A. Similarly, the first feature 312, a third feature 358, the first device 318, and a third device 360 are assigned to a second provider device that is associated with the second scope 316B. The first device 318, the second device 356, and the third device 360 may be substantially similar to and may correspond to the user devices 106 described with reference to FIGS. 1 and 2. The first feature 312, the second feature 354, and the third feature 358 may include an element or an article that may be modified to address or correct a technical issue. For instance, the features 312, 354, and 358 may include a setting or an application on one of the devices 318, 356, or 360, an authorization level, an administrative access, or some combination that may be modified or changed through a remote function to correct a technical issue.

In the embodiment of FIGS. 3A and 3B, the devices 318, 356, and 360 are statically assigned to the scopes 316. In these and other embodiments, the scope may be configured such that the devices 318, 356, and 360 and features 312, 354, and 358 are not visible to the particular IT provider prior to being dynamically elevated and following being dynamically relegated. For instance, when the devices 318, 356, and 360 and features 312, 354, and 358 are in the inaccessible portions 310A and 310B, they may not be visible to the IT provider associated with the scopes 316. In some embodiments, the scopes 316 may include a permanent device. The permanent device may be substantially similar to the devices 318, 356, or 360. The permanent devices may be statically assigned to one of the scopes 316 and may not be affected by the elevation.

In FIG. 3A, the first scope 316A is depicted at three times, separated by two indicators 344 and 346. The two indicators 344 and 346 correspond to times in which reports or messages are received. For instance, with respect of FIGS. 1 and 3, a first indicator 344 may correspond to a time or a circumstance at which the incident report is communicated by the user device 106. A second indicator 346 may correspond to a time or a circumstance at which the resolution message is communicated by the provider device 104. In FIG. 3B, the second scope 316B is depicted at four times, separated by three indicators 344, 346, and 347. The two indicators 344 and 346 are described above. A third indicator 347 corresponds to times in which an additional resolution message is communicated from a provider device associated with the second scope 316B.

With combined reference to FIGS. 3A and 3B, prior to the first indicator 344, the devices 318, 356, and 360 and the features 348, 312, and 354 associated therewith are located in the inaccessible portion 310A or 310B. Accordingly, prior to receipt of the incident report, neither of the provider devices associated with the scopes 316 are able to access any of the devices 318, 356, or 360 or features 312, 354, and 358. In some embodiments, an incident management server may prevent access to any of the devices 318, 356, or 360 or features 312, 354, and 358. Following receipt of the incident report that pertains to a technical issue at the first device 318, the first feature 312 and/or the first device 318 may be elevated to the accessible portion 314A of the first scope 316A. The second scope 316B may not change responsive to the incident report.

The elevation of the first device 318 and the first feature 312 may modify a state of an access privilege. For example, the provider device associated with the first scope 316A may access the first device 318 and/or take an action or perform a function related to the first feature 312. In some embodiments, a restriction 323 may also be imposed as described elsewhere in the present disclosure.

The second indicator 346 corresponds to receipt of the resolution message. The resolution message may be communicated by the provider device associated with the first scope 316A. The resolution message may indicate that at least a part of a correction or an attempt of a correction was implemented at the first device 318. Responsive to the resolution message, the first feature 312 and the first device 318 may be relegated to the inaccessible portion 310A of the first scope 316A.

Additionally, with reference to FIG. 3B, following the second indicator 346, the first device 318 and the first feature 312 may be elevated to the accessible portion 314B of the second scope 316B. With the elevation of the first device 318 and the first feature 312, a state of an access privilege of the second scope 316B and the first feature 312 may be modified. Thus, the provider device associated with the second scope 316B may access and/or control the first device 318 and/or perform a function or perform an action associated with a first feature 312. In some embodiments, a restriction 325 may also be imposed.

The third indicator 347 corresponds to receipt of a second resolution message communicated by the provider device associated with the second scope 316B. The second resolution message may indicate that at least another part of the correction or another attempt of the correction was implemented at the first device 318. Responsive to the second resolution message, the first feature 312 and the first device 318 may be relegated to the inaccessible portion 310B of the second scope 316B.

Figure 4:
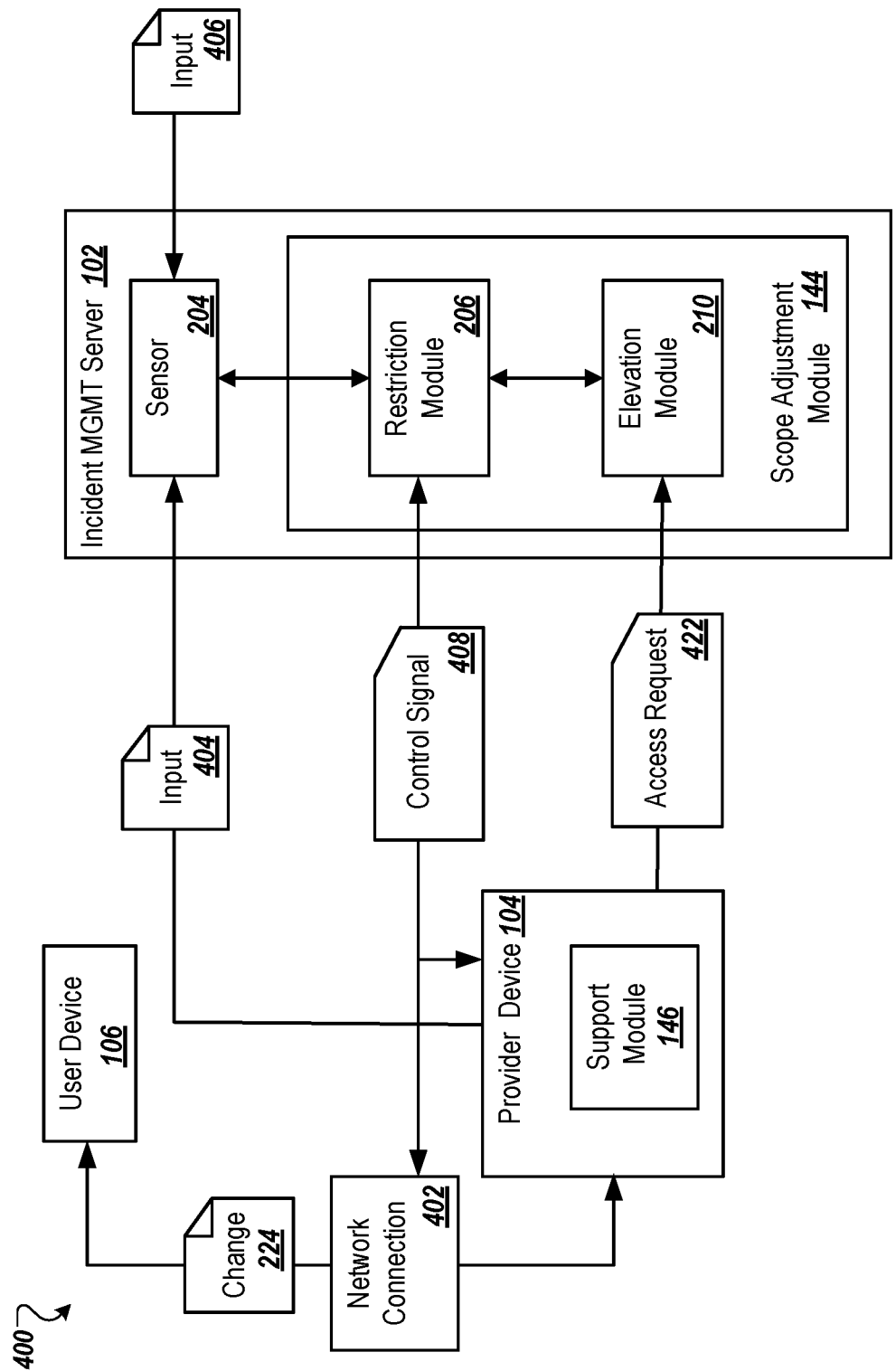
FIG. 4 depicts an example restriction process that may be implemented in the operating environment of FIG. 1 and with the remote device access process of FIG. 1.

FIG. 4 depicts an example restriction process 400 according to at least one embodiment of the present disclosure. The restriction process 400 of FIG. 4 is depicted with reference to a subset of the components (e.g., 102, 106, 104, 146, and 144) described elsewhere in the present disclosure. The restriction process 400 may be performed during a dynamic elevation of the user device 106 into a scope of the provider device 104, which may be associated with an IT provider. In some circumstances, the restriction may be an additional safeguard that may be imposed in addition to the dynamic scope adjustment described with reference to FIGS. 1-3B.

In the restriction process 400, the sensor 204 may be configured to receive input 406 and/or input 404 (collectively, input 404/406). The input 406/404 may be associated with one or more access restrictions imposed by the scope adjustment module 144. The input 404/406 may be a value or data indicative of a status that enables the restriction module 206 to determine whether a state or condition exists at the provider device 104. The input 404/406 may differ based on the restriction(s) imposed by the scope adjustment module 144. For example, one of the restrictions may include enabling access only during normal business hours. Accordingly, the input 404/406 may include a time signal. Additionally or alternatively, one of the restrictions may include enabling access only when the IT provider is logged into the provider device 104. Accordingly, the input 404/406 may include a current log-in status of the provider device 104.

The input 406 may include sensor input that is received from an outside system or from the environment. For instance, the sensor 204 may include a clock and the input 406 may include a signal indicative of the time. The input 404 may include a signal communicated from the provider device 104. The input 404 may be indicative of a state of the provider device 104 such as whether the IT provider is logged into the provider device 104, whether the IT provider is currently addressing a particular technical issue of the user device 106, a location of the provider device 104, a physical location of the provider device 104, another condition or state of the provider device 104, or some combination thereof. The method 700 may begin at block 702 in which an input related to a restriction may be received. The input may include a time such as during business hours, a log in status such as whether the IT provider is logged into the second device, a status of a helpdesk ticket, whether the IT provider is currently working on a particular helpdesk ticket, another restriction, or some combinations thereof.

The input 406/404 or an indication thereof may be communicated to the restriction module 206. Based on the input 406/404, the restriction module 206 may be configured to determine whether one of the restrictions is triggered. For example, the restriction module 206 may compare the input 404/406 to a threshold value, may compare the input 404/406 against a particular value, may apply a verification or validation operation, or otherwise make a determination regarding whether the input 404/406 triggers the restriction.

The elevation module 210 or another component of the scope adjustment module 144 may be configured to receive an access request 422. The access request 422 may be a signal indicative of the provider device 104 attempting to access the user device 106. In some embodiments, the access request 422 may be communicated from the provider device 104. In some embodiments, the access request 422 may be visible by the incident management server 102 through monitoring a network including the user device 106 and the provider device 104.

Responsive to the access request 422, the restriction module 206 may implement an operation to determine whether the input 404/406 triggers one or more of the restrictions. Consistent with the determination of whether the restrictions are triggered, the restriction module 206 may communicate a control signal 408. The control signal 408 may be communicated to the provider device 104 and/or a network connection 402. The control signal 408 may enable or disable access to the user device 106 by the provider device 104. For instance, the control signal 408 may disable the scope of the provider device 104 and/or disable a network connection between the user device 106 and the provider device 104. In circumstances in which the control signal 408 disables the connection between the user device 106 and the provider device 104, a change 224 may be prevented from being implemented on the user device 106.

Figure 5:
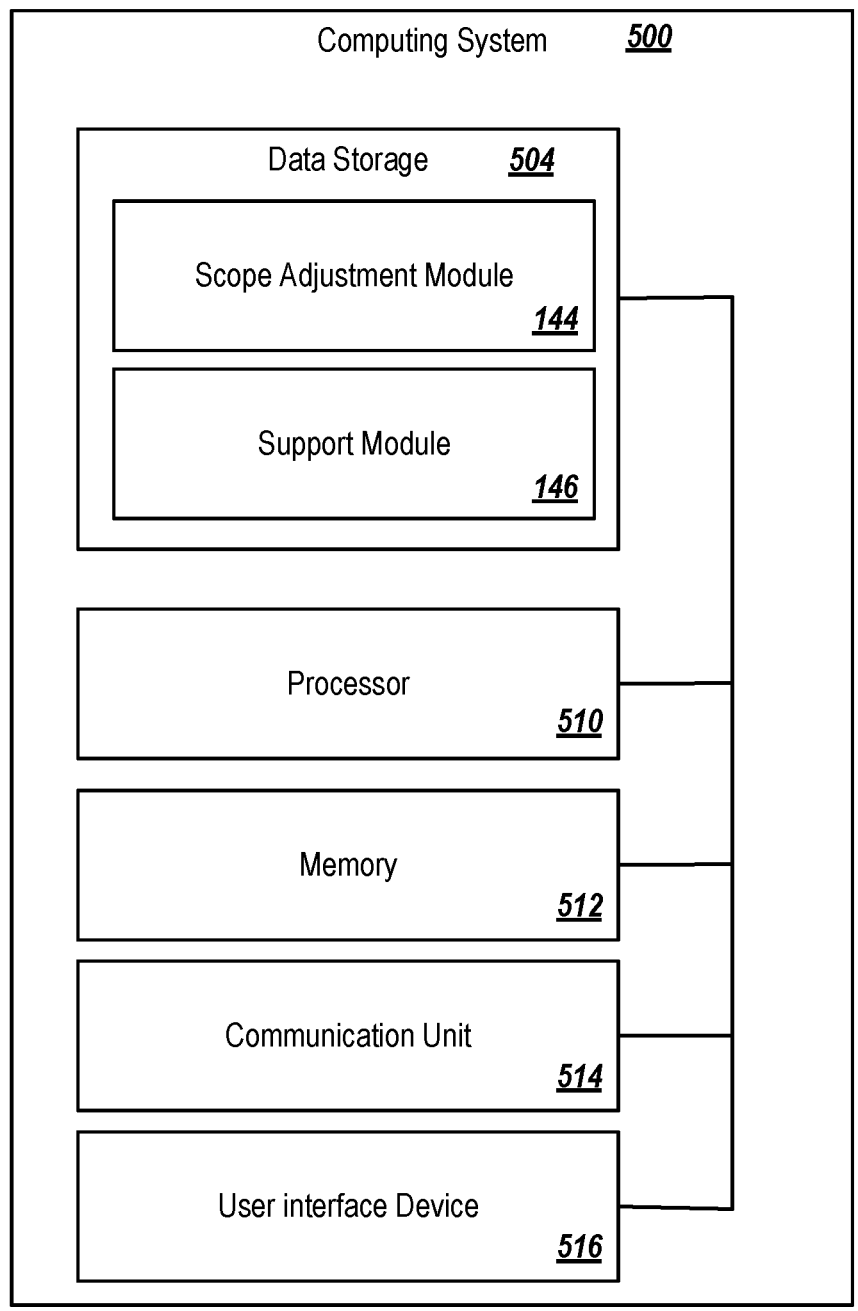
FIG. 5 illustrates an example computing system configured for secured, remote device access.

FIG. 5 illustrates an example computing system 500 configured for secured, remote device access according to at least one embodiment of the present disclosure. The computing system 500 may be implemented in the operating environment 100 of FIG. 1, for instance. Examples of the computing system 500 may include the incident management server 102, the provider device 104, the user device 106, or some combination thereof. The computing system 500 may include one or more processors 510, a memory 512, a communication unit 514, a user interface device 516, and a data storage 504 that includes the scope adjustment module 144 and the support module 146 (collectively, modules 144/146).

The processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 5, the processor 510 may more generally include any number of processors configured to perform individually or collectively any number of operations described in the present disclosure. Additionally, one or more of the processors 510 may be present on one or more different electronic devices or computing systems. In some embodiments, the processor 510 may interpret and/or execute program instructions and/or process data stored in the memory 512, the data storage 504, or the memory 512 and the data storage 504. In some embodiments, the processor 510 may fetch program instructions from the data storage 504 and load the program instructions in the memory 512. After the program instructions are loaded into the memory 512, the processor 510 may execute the program instructions.

The memory 512 and the data storage 504 may include computer-readable storage media for carrying or having computer-executable instructions or data structures stored thereon. Such computer-readable storage media may include any available media that may be accessed by a general-purpose or special-purpose computer, such as the processor 510. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 514 may include one or more pieces of hardware configured to receive and send communications. In some embodiments, the communication unit 514 may include one or more of an antenna, a wired port, and modulation/demodulation hardware, among other communication hardware devices. In particular, the communication unit 514 may be configured to receive a communication from outside the computing system 500 and to present the communication to the processor 510 or to send a communication from the processor 510 to another device or network (e.g., 108 of FIG. 1).

The user interface device 516 may include one or more pieces of hardware configured to receive input from and/or provide output to a user. In some embodiments, the user interface device 516 may include one or more of a speaker, a microphone, a display, a keyboard, a touch screen, or a holographic projection, among other hardware devices.

The modules 144/146 may include program instructions stored in the data storage 504. The processor 510 may be configured to load the modules 144/146 into the memory 512 and execute the modules 144/146. Alternatively, the processor 510 may execute the modules 144/146 line-by-line from the data storage 504 without loading them into the memory 512. When executing the modules 144/146, the processor 510 may be configured to perform a participation verification process as described elsewhere in this disclosure.

Modifications, additions, or omissions may be made to the computing system 500 without departing from the scope of the present disclosure. For example, in some embodiments, the computing system 500 may not include the user interface device 516. In some embodiments, the different components of the computing system 500 may be physically separate and may be communicatively coupled via any suitable mechanism. For example, the data storage 504 may be part of a storage device that is separate from a server, which includes the processor 510, the memory 512, and the communication unit 514, that is communicatively coupled to the storage device. The embodiments described herein may include the use of a special-purpose or general-purpose computer including various computer hardware or software modules, as discussed in greater detail below.

Figure 6:
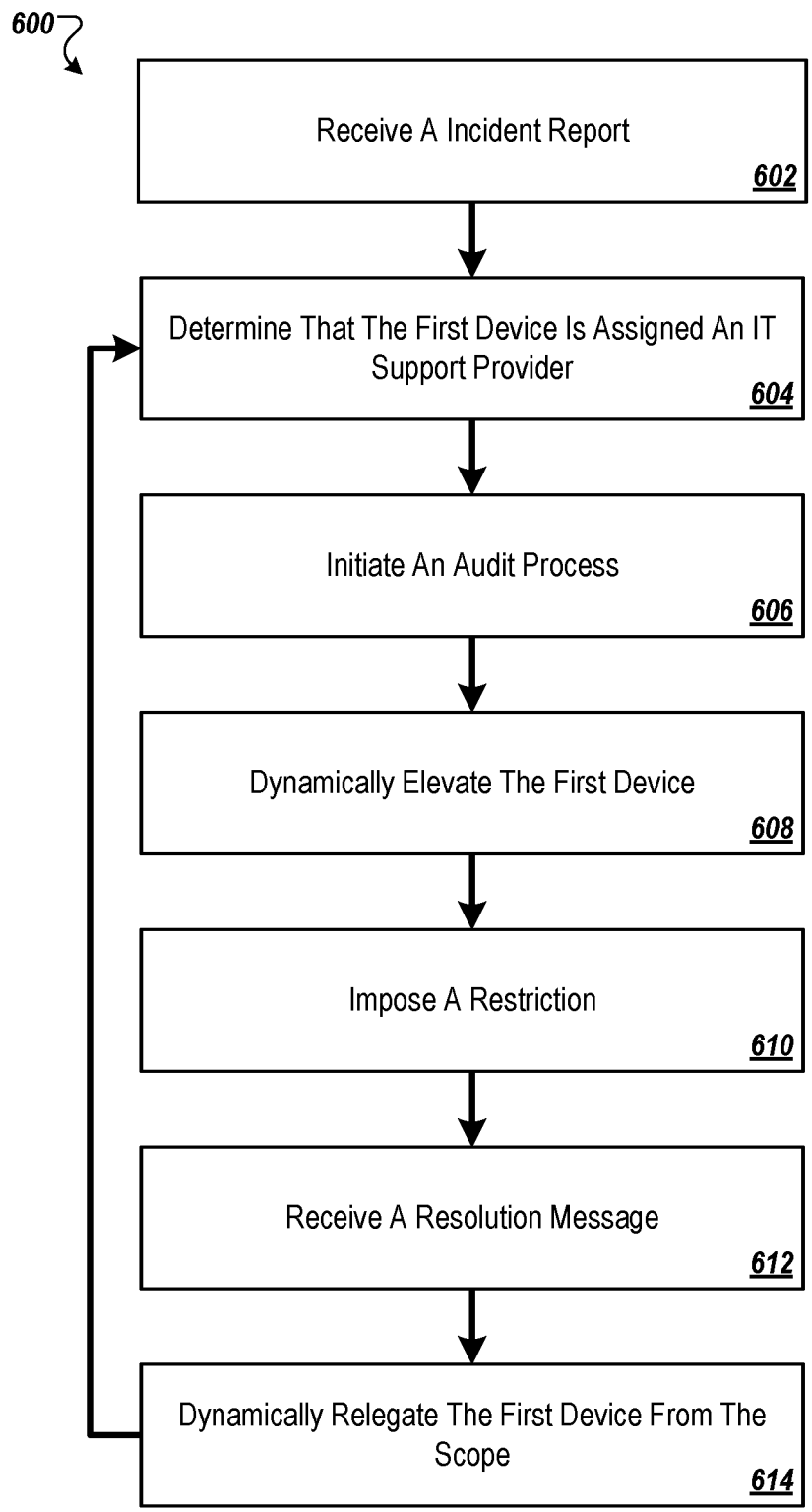
FIG. 6 is a flow chart of an example method of secured, remote device access.

FIG. 6 is a flow chart of an example method 600 of secured, remote device access, according to at least one embodiment described in the present disclosure. As described elsewhere in the present disclosure, the method 600 may involve or may be based on dynamic scope adjustment. The dynamic scope adjustment may be performed in an incident management system or another suitable environment such as the operating environment 100. The method 600 may be implemented in an information technology service management (ITSM) system or by an incident management server. The ITSM system may be included in a cloud-based networked system, an on-premises system, a managed network, managed subnetwork, or another suitable network computing environment.

The method 600 may begin at block 602 in which an incident report may be received. The incident report may be received by an incident management server. The incident report may be indicative of a technical issue at a first device. Some examples of the technical issue are an improperly functioning software application, a hardware or software integration issue, presence of unauthorized software, a request for an additional piece of hardware or software, an acute incident related to a piece of hardware or software, a virus or threat, a suspicious email, combinations thereof, or another similar technical issue.

At block 604, it may be determined that the first device is assigned a particular IT provider. A determination of an assignment between the first device and the IT provider may occur responsive to receipt of the incident report. In some embodiments, the incident management server may make the determination of the assignment between the IT provider and the first device. For example, the IT provider may be statically assigned to the first device. In these implementations, a scope of the IT provider may include one or more permanent device, which may be statically assigned to the particular IT provider. The scope may be configured such that the first device is not visible to the IT provider prior to being dynamically elevated and following being dynamically relegated as described below. In these and other embodiments, the incident management server may retrieve data indicative of the assignment between the first device and the IT provider.

Additionally or alternatively, the first device may be actively assigned to the IT provider. For instance, the first device may be assigned to the IT provider in real time and/or responsive to the incident report. In some implementations, an assignment may be based on content or topic of the incident report, a level of sophistication of a user associated with the first device, a specialty of the IT provider, another factor, or some combination thereof. In some embodiments, the assignment may be performed as described in U.S. Pat. Nos. 8,135,612 or 8,804,941, which are incorporated herein by reference in their entireties. In some implementations, the scope may be configured such that the first device is not visible to the IT provider prior to being dynamically elevated and following being dynamically relegated as described below.

At block 606, an audit process may be initiated. The audit process may be implemented to track metrics associated with the incident report. For example, the audit process may track the content of the incident report, the IT provider, resolution, the user, the first device, other metrics, or combinations thereof. The audit process may be initiated automatically in response to the incident report.

At block 608, the first device may be dynamically elevated. The first device may be dynamically elevated to a scope of the IT provider. For example, the incident management system server may dynamically elevate the first device to the scope of the IT provider. In some embodiments, the dynamically elevating of the first device includes a modification of an access privilege of a second device associated with the IT provider relative to the first device. The modification of the access privilege may include a modification from a first state in which the first device is prevented from being remotely accessed by the second device to a second state in which the second device is capable of remotely accessing the first device and remotely implementing at least one change on the first device via a network communication channel. Additionally or alternatively, the dynamically elevating may include a modification to a feature of the IT provider relative to the first device. The feature may include action or subsystem on the first device. For example, prior to the elevation, the IT provider may be prevented from performing a function on the first device. Following the elevation, the IT provider may be able to perform the function. Some examples of the function may include installing, removing, or re-installing a software application, enabling or disabling a software or hardware, changing a setting, running diagnosis, remotely operating the first device, and the like.

In some embodiments, the dynamic elevating may be performed substantially concurrent with or without material delay following receipt of the incident report from the first device of block 602. Additionally or alternatively, the dynamic elevation of block 608, the initiation of the audit process of block 606, the determination of the assignment between the IT provider and the first device of block 604, or some combination thereof may occur substantially concurrent and responsive to the receipt of the incident report of block 602.

At block 610 a restriction may be imposed. The restriction may be imposed on the access to the first device by the second device while the first device is elevated to the scope. In some embodiments, the restriction may be triggered by one or more conditions of the system implementing the method 600. For instance, responsive to the one or more conditions, the access to the first device may be prevented by the second device.

At block 612 a resolution message may be received. The resolution message may indicate a correction or at least a portion of a correction has occurred. Alternatively, the resolution message may indicate that the IT provider is unable to correct the technical issue. At block 614, the first device may be dynamically relegated from the scope. For instance, the first device may be dynamically relegated following a correction of at least a portion of the technical issue by the particular IT provider. In some embodiments, the incident management system may dynamically relegate the first device from the scope of the IT provider. After the first device is relegated from the scope, the second device may be prevented from remotely accessing to the first device. In some embodiments, dynamically relegating the first device may be performed responsive to the resolution message. For instance, the dynamic relegating may be performed substantially concurrent with or without material delay following receipt of the resolution message.

Accordingly, implementation of the method 600 may enable the first device to be remotely accessed by the second device while the first device is elevated into the scope and then prevented from being remotely accessed prior to being elevated and following the dynamic relegation. Additionally, the method 600 concurrent initiates an audit process and/or implements an assignment process. The method 600 thus addresses a technical problem in conventional systems and improves security of incident management systems. For example, the method 600 optimizes the flexibility and efficiency of the incident management systems through elevating the scope concurrently with the ticket. Moreover, the method 600 optimizes the security of incident management systems by removing the security threat introduced by having the scope of the IT provider being statically assigned.

In some embodiments, the incident management system may include helpdesk ticket system. In helpdesk ticket systems applications, a helpdesk application may be loaded onto the user devices. The helpdesk application may include a helpdesk ticket submission capability. For instance, the user may notice or be subject to the technical issue. In response, the user may provide some input to the user device or another device to initiate a ticket that outlines the technical issue. The ticket may be communicated to the ITMS system server and may be the basis of intervention by the IT providers. In these and other embodiments, the incident report from the first device may include a helpdesk ticket or a similar ticket submission. Additionally, in these and other embodiments, the resolution message may include a helpdesk ticket closure or a helpdesk ticket partial closure. The helpdesk ticket closure or the helpdesk ticket partial closure may be initiated by the IT provider in the second device or another device associated with the IT provider.

Additionally, in some embodiments, multiple devices may be involved in correction of the technical issue. For instance, the correction may be challenging, and the IT provider may be unable to correct the technical issue. Additionally or alternatively, the technical issue may involve two or more steps that may be implemented by two or more IT providers. For example, the IT provider may correct a first part of the technical issue and a second IT provider may correct a second part of the technical issue. Accordingly, the IT provider assigned to the first device may be a first IT provider, the scope may include a first scope associated with the first IT provider, and the correction may include a first correction that addresses only the first part of the technical issue. In these and other embodiments, the method 600 may proceed from block 614 to block 604 and proceed through one or more of blocks 604, 606, 608, 610, 612, and 614.

For example, at block 604, it may be determined that the first device is assigned to the second IT provider. At block 606, the audit process may be further initiated to include the second IT provider. At block 608, the first device may be dynamically elevated to a second scope. The second scope may be the scope of a second IT provider, who may be associated with a third device.

The dynamically elevating the first device to the scope of the second IT provider may occur following or immediately following dynamically relegating the first device from the first scope or following implementation of one or more of blocks 604 and 606. For instance, after the first IT provider communicates the resolution message that the first part of the correction is implemented or they are unable to correct the issue, the incident management server may then dynamically elevate the first device to the second scope of the second IT provider.

Additionally, as described above with respect to the second device, the first device may be dynamically relegated (block 614) from the second scope following receipt of the additional resolution message of block 612. The dynamic relegation may prevent or substantially prevent remote access to the first device following the second correction by the second IT provider implemented using the third device.

Figure 7:
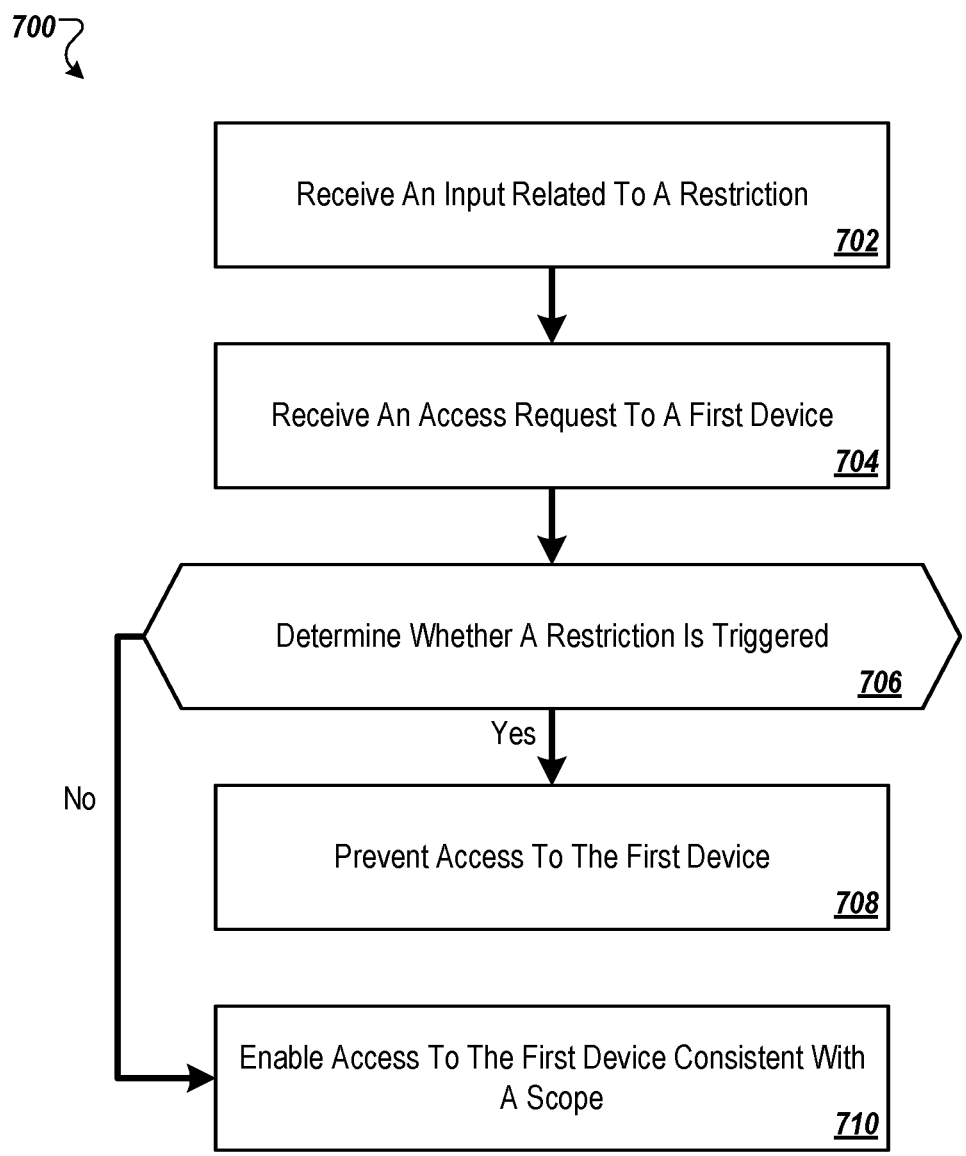
FIG. 7 is a flow chart of an example method of restriction imposition, all according to at least one embodiment described in the present disclosure.

FIG. 7 is a flow chart of an example method 700 of restriction imposition, according to at least one embodiment of the present disclosure. The method 700 may be implemented as a part or subprocess of another method. For example, the method 700 may be implemented as block 610 of the method 600. The method 700 may be performed during a dynamic elevation of a first device onto a scope of an IT provider. For example, the restriction may be an additional safeguard that may be imposed in addition to the dynamic scope adjustment.

The method 700 may begin at block 702 in which an input related to a restriction may be received. The input may be received from a sensor or a system that provides a status or condition of a computing device. For example, the input may include a time such as during business hours, a log in status such as whether the IT provider is logged into the second device, a status of an incident report or a helpdesk ticket, an indication of whether the IT provider is currently working on a particular incident or helpdesk ticket, a physical location of a provider device, indication of another restriction, or combinations thereof.

At block 704, an access request may be received. The access request may be a signal requesting access or an attempted access to a first device by a second device, which is associated with an IT provider. At block 706, it may be determined whether a restriction is triggered. The determination may be at least partially based on the received input of block 702. Additionally, the determination may be made at the time of the access request received at block 704. For instance, the restriction may limit access to the first device during business hours. In this example, the input may include a time of the access request. Responsive to the time being outside of working hours of the IT provider, the restriction may be triggered. Similarly, the restriction may require the IT provider to be logged in to a specific machine (e.g., a specific computing device). In this example, the input may include a log in status. Responsive to the IT provider not being logged in to a particular device, the restriction may be triggered.

Responsive to the restriction being triggered ("YES" at block 706), the method 700 may proceed to block 708. At block 708, access to the first device may be prevented. For example, the IT provider may be prevented from remotely accesses and/or implementing a change on the first device. Responsive to the restriction not being triggered ("NO" at block 706), the method 700 may proceed to block 710. At block 710, access to the first device may be enabled. For instance, the access to the first device may be enabled consistent with a scope or a scope with an elevated first device present.

Although illustrated as discrete blocks, one or more blocks in FIGS. 6 and 7 may be divided into additional blocks, combined into fewer blocks, or eliminated, depending on the desired implementation. The methods 600 or 700 may be performed in an operating environment such as the operating environment 100 of FIG. 1. The methods 600 or 700 may be performed in some embodiments by the incident management server 102, the support module 146, the scope adjustment module 144 or some combination thereof described with reference to FIGS. 1-4. In some embodiments, the incident management server 102, the provider devices 104, or another computing system may include or may be communicatively coupled to a non-transitory computer-readable medium (e.g., the memory 512 of FIG. 5) having stored thereon programming code or instructions that are executable by one or more processors (such as the processor 510 of FIG. 5) to cause a computing system, the provider devices 104, the incident management server 102 or some combination thereof to perform or control performance of the methods 600 or 700. Additionally or alternatively, the incident management server 102 or the provider devices 104 may include the processor 510 described elsewhere in this disclosure that is configured to execute computer instructions to cause the incident management server 102, the provider devices 104, or one or more other computing systems to perform or control performance of the methods 600 or 700.

Further, modifications, additions, or omissions may be made to the methods 600 or 700 without departing from the scope of the present disclosure. For example, the operations of methods 600 or 700 may be implemented in differing order. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one"

or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of secured, remote device access through dynamic scope adjustment in an incident management system, the method comprising:
   receiving, at an incident management server, an incident report indicative of a technical issue at a first device;
   responsive to receipt of the incident report:
      determining, by the incident management server, that the first device is assigned to an information technology (IT) support provider of a plurality of IT support providers; and
      dynamically elevating, by the incident management server, the first device to a scope of the IT support provider, wherein the dynamically elevating of the first device includes a modification of an access privilege of a second device associated with the IT support provider relative to the first device;
   receiving an access request for the first device by the second device;
   at the time of receipt of the access request, determining whether a restriction is triggered based on received input from a sensor, wherein the restriction is configured to limit access to the first device responsive to a condition being present;
   responsive to a determination that the restriction is triggered:
      imposing the restriction on the access to the first device by the second device while the first device is elevated to the scope; and
      while the restriction is imposed, preventing access to the first device by the second device;
   while the first device is dynamically elevated to the scope of the IT support provider, receiving subsequent input from the sensor;
   further determining whether the restriction is triggered based on the received subsequent input;
   responsive to a determination that the restriction is not triggered, enabling access to the first device by the second device such that the second device corrects at least a portion of the technical issue; and
   following a correction of at least a portion of the technical issue by the IT support provider, dynamically relegating, by the incident management server, the first device from the scope to prevent remote access to the first device following the correction.

2. The method of claim 1, wherein the modification of the access privilege includes a modification from a first state in which the first device is prevented from being remotely accessed by the second device to a second state in which the second device is capable of remotely accessing the first device and remotely implementing at least one change on the first device via a network.

3. The method of claim 1, wherein the correction includes:
   the first device being remotely accessed by the second device while the first device is elevated into the scope; and
   implementation of at least one change on the first device.

4. The method of claim 1, further comprising receiving a resolution message from the second device, the resolution message indicating the correction has occurred, wherein:
   the dynamically relegating the first device is performed responsive to the resolution message;
   the dynamically elevating is performed substantially concurrent with or without material delay following receipt of the incident report; and
   the dynamically relegating is performed substantially concurrent with or without material delay following receipt of the resolution message.

5. The method of claim 1, further comprising receiving a resolution message from the second device, the resolution message indicating the correction has occurred, wherein:
   the dynamically relegating the first device is performed responsive to the resolution message,
   the incident report includes a helpdesk ticket that is at least partially input by a first user into the first device or into another device associated with the first user;
   the resolution message includes a helpdesk ticket closure, or a helpdesk ticket partial closure initiated by the IT support provider; and
   the resolution message is initiated in the second device, or another device associated with the IT support provider.

6. The method of claim 1, wherein the restriction further includes one or more or a combination of:
   a time period during which access to the first device is allowed;
   an application to which a change to the first device is limited; and
   a subsystem to which a change to the first device is limited.

7. The method of claim 1, further comprising initiating an audit process based on the received incident report, wherein the audit process is initiated automatically in response to the incident report.

8. The method of claim 1, wherein:
   the first device is statically assigned to the IT support provider;
   the scope includes a permanent device statically assigned to the IT support provider; and
   the scope is configured such that the first device is not visible to the IT support provider prior to being dynamically elevated and is not visible to the IT support provider following being dynamically relegated.

9. The method of claim 1, further comprising dynamically elevating a feature, wherein the feature includes:

an ability to remotely implement an action; or
an ability to interface with a subsystem on the first device.

10. The method of claim 1, wherein:
the incident management system is included on a cloud-based networked system that includes the second device;
the IT support provider is a first IT support provider of the plurality of IT support providers;
the scope includes a first scope associated with the first IT support provider;
the correction includes a first correction that addresses only a first part of the technical issue; and
the method further comprises:
following dynamically relegating the first device from the first scope, dynamically elevating the first device to a second scope of a second IT support provider associated with a third device; and
following a second correction that addresses a second part of the technical issue, dynamically relegating the first device from the second scope to prevent remote access to the first device following the second correction by the third device.

11. A non-transitory computer-readable medium having encoded therein programming code executable by one or more processors to perform or control performance of operations of secured, remote device access through dynamic scope adjustment in an incident management system, the operations comprising:
receiving, at an incident management server, an incident report indicative of a technical issue at a first device;
responsive to receipt of the incident report:
determining, by the incident management server, that the first device is assigned to an information technology (IT) support provider of a plurality of IT support providers; and
dynamically elevating, by the incident management server, the first device to a scope of the IT support provider, wherein the dynamically elevating of the first device includes a modification of an access privilege of a second device associated with the IT support provider relative to the first device;
receiving an access request for the first device by the second device;
at the time of receipt of the access request, determining whether a restriction is triggered based on received input from a sensor, wherein the restriction is configured to limit access to the first device responsive to a condition being present;
responsive to a determination that the restriction is triggered:
imposing the restriction on the access to the first device by the second device while the first device is elevated to the scope; and
while the restriction is imposed, preventing access to the first device by the second device;
while the first device is dynamically elevated to the scope of the IT support provider, receiving subsequent input from the sensor;
further determining whether the restriction is triggered based on the received subsequent input;
responsive to a determination that the restriction is not triggered, enabling access to the first device by the second device such that the second device corrects at least a portion of the technical issue; and
following a correction of at least a portion of the technical issue by the IT support provider, dynamically relegating, by the incident management server, the first device from the scope to prevent remote access to the first device following the correction.

12. The non-transitory computer-readable medium of claim 11, wherein the modification of the access privilege includes a modification from a first state in which the first device is prevented from being remotely accessed by the second device to a second state in which the second device is capable of remotely accessing the first device and remotely implementing at least one change on the first device via a network.

13. The non-transitory computer-readable medium of claim 11, wherein the correction includes:
the first device being remotely accessed by the second device while the first device is elevated into the scope; and
implementation of at least one change on the first device.

14. The non-transitory computer-readable medium of claim 11, wherein:
the operations further comprise receiving a resolution message from the second device;
the resolution message indicating the correction has occurred;
the dynamically relegating the first device is performed responsive to the resolution message;
the dynamically elevating is performed substantially concurrent with or without material delay following receipt of the incident report; and
the dynamically relegating is performed substantially concurrent with or without material delay following receipt of the resolution message.

15. The non-transitory computer-readable medium of claim 11, wherein:
the operations further comprise receiving a resolution message from the second device;
the dynamically relegating the first device is performed responsive to the resolution message;
the incident report includes a helpdesk ticket that is at least partially input by a first user into the first device or into another device associated with the first user;
the resolution message includes a helpdesk ticket closure, or a helpdesk ticket partial closure initiated by the IT support provider; and
the resolution message is initiated in the second device, or another device associated with the IT support provider.

16. The non-transitory computer-readable medium of claim 11, wherein:
the restriction further includes one or more or a combination of:
a time period during which access to the first device is allowed;
an application to which a change to the first device is limited; and
a subsystem to which a change to the first device is limited.

17. The non-transitory computer-readable medium of claim 11, wherein:
the operations further comprise initiating an audit process based on the received incident report; and
the audit process is initiated automatically in response to the incident report.

18. The non-transitory computer-readable medium of claim 11, wherein:
the first device is statically assigned to the IT support provider;
the scope includes a permanent device statically assigned to the IT support provider; and the scope is configured such that the first device is not visible to the IT support provider prior to being dynamically elevated and is not visible to the IT support provider following being dynamically relegated.

19. The non-transitory computer-readable medium of claim 11, wherein:
the operations further comprise dynamically elevating a feature; and
the feature includes:
an ability to remotely implement an action; or
an ability to interface with a subsystem on the first device.

20. The non-transitory computer-readable medium of claim 11, wherein:
the incident management system is included on a cloud-based networked system that includes the second device;
the IT support provider is a first IT support provider of the plurality of IT support providers;
the scope includes a first scope associated with the first IT support provider;
the correction includes a first correction that addresses only a first part of the technical issue; and
the operations further comprise:
following dynamically relegating the first device from the first scope, dynamically elevating the first device to a second scope of a second IT support provider associated with a third device; and
following a second correction that addresses a second part of the technical issue, dynamically relegating the first device from the second scope to prevent remote access to the first device following the second correction by the third device.

* * * * *